Aug. 16, 1927.

D. ELDER 1,639,220

SPRAYING NOZZLE

Filed Feb. 11, 1926

Inventor
Donald Elder,
By Henry Orth Jr. Atty

Patented Aug. 16, 1927.

1,639,220

UNITED STATES PATENT OFFICE.

DONALD ELDER, OF ONEHUNGA, NEW ZEALAND.

SPRAYING NOZZLE.

Application filed February 11, 1926, Serial No. 87,631, and in Australia February 28, 1925.

This invention refers to spraying devices for water and the like under pressure and has been devised principally to provide a nozzle that will ensure an even distribution of water over an area of ground surface of approximately semi-circular or quadrant shape so that spraying nozzles may be located at the side edges or corners of lawns to spray the ground surface that is often missed when nozzles imparting a circular spray are used.

According to a known form of cylindrical nozzle for the purpose there is formed in the side an approximately V-shaped gap communicating with the bore of the nozzle and with the upper wall surface of the gap inclined to overlie the outlet of the bore and perfectly flat, said nozzle being used to spray semi-circular areas of ground. This form of nozzle is unsatisfactory as the largest volume of the water is thrown from the centre of the upper wall surface of the gap straight forwardly with the result that only a small quantity is sprayed at the sides and moreover the water droops at the side corners of the gap, the result being uneven watering of the ground at the sides or corners of lawns for instance.

According to these improvements the upper wall surface of the gap is not flat but curved towards its side edges. The extent of the gap determines the fan shaped area of ground that will be sprayed.

The nozzle is applicable to most forms of spraying means such as standard rotary frames and spring controlled valvular nozzles operated by the water pressure and used at the ground level and the invention incorporates certain improvements in said valvular nozzles.

In the accompanying drawings, Figure 1 is a vertical section through one of the valvular spraying devices used at the ground level and incorporating the improvements.

Figure 1:
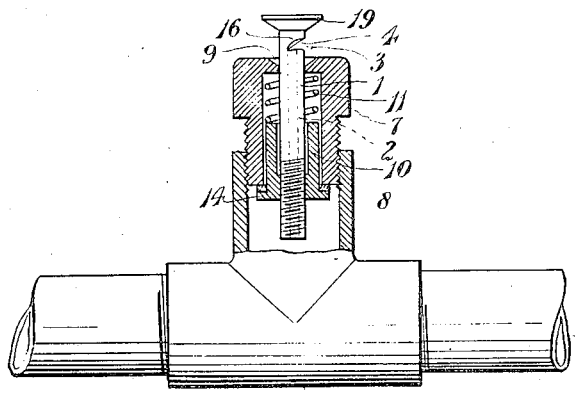

The nozzles 1 of the devices have the usual bore 2 through which the water is delivered and the approximately V-shaped gap 3 formed in the side of the nozzle, the upper wall surface 4 of the gap being curved away towards its side edges 16.

For the purpose of forming the approximately convex surface a rotating cutter having two diametrically opposed teeth and formed of small diameter may be employed. With such a cutter the upper wall 4 of the gap, which is V-shaped in section, will have a convex cylindrical form, and the lower wall will have a concave form.

The combining of convex wall with V-shaped gap so directs the water that it will form a true semi-circle and not an ellipse in which the length is greater than the width.

The combined V-shaped gap and cylindrical surface also produce a more uniform jet effect.

Figures 2, 3, 5:
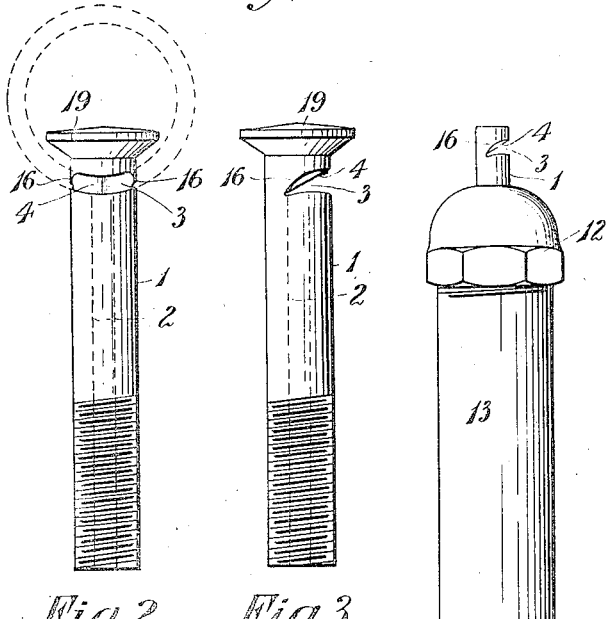
Figure 2 is an enlarged front elevation of the nozzle used for semi-circular spraying, and Figure 3 a side elevation.
Figure 5 is a view showing the nozzle as adapted for standard spraying apparatus of either the stationary or revolving type.

The cutter which forms no part of the invention is indicated in broken lines in Figure 2.

Figure 4:
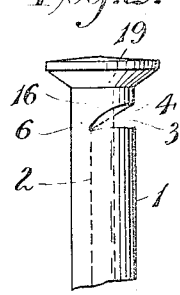
Figure 4 is a similar view to Figure 3 but showing the gap shortened to adapt the nozzle for spraying corners of lawns.

If a semi-circular distribution of water extending 180 degrees is required the inner end of the gap 3 terminates just clear of the bore 2 as in Figure 3. If a corner spray is required to spread water over a quadrant shaped area through 90 degrees the depth of the gap 3 in the nozzle is correspondingly shortened as illustrated in Figure 4. If the gap is formed by a rotary cutter a gap similar to Figure 3 may be first formed and subsequently the side corners are filled in with wedges of metal 6 as indicated in Figure 4 or alternatively the corners of the gap are partially closed as for instance by die casting the gap.

According to Figure 1 the nozzle 1 is fitted to a ground level valvular spraying device controlled by the pressure of water. The nozzle extends through a cylindrical casing 7 screwed to the T junction 8 of the water supply pipe and it has at the top the usual mushroom head valve 19 that fits a seating 9 formed in the top of the casing. The inner end of the nozzle is screwed into a cylindrical nut 10 against which the spring 11 in the casing bears and said nut is formed with a circular flange 14. With this construction the water under pressure impinges against said flange and so raises the nozzle and maintains its gap 3 clear of the top of the casing. The spring 11 may be dispensed with if the nozzle is of sufficient weight to close the valve when the water supply is cut off.

This construction is an improvement on the known form in which the nut is formed with passages for the water which raises the nozzle by impinging on the valve.

Figure 5 illustrates the nozzle 1 formed integral with a nut 12 which is screwed on a standard 13 said nozzle having a gap with the curved surface as described.

I claim:

1. A sprayer comprising a nozzle having a bore, and a lateral gap V-shaped in cross section, the said bore terminating in said gap, the wall of said gap opposite the bore being a convex-cylindrical surface and the opposite wall being a concave-cylindrical surface.

2. A sprayer, comprising a nozzle having a bore and a lateral gap V-shaped in cross section, the said bore terminating in said gap, the wall of said gap opposite the bore being a convex-cylindrical surface and the opposite wall being a concave-cylindrical surface, and the corners of the gap being closed to direct a spray less than a semi-circle.

Dated this 11th day of January, 1926.

DONALD ELDER.